United States Patent [19]
Varsanyi

[11] 3,747,017
[45] July 17, 1973

[54] ENERGY CONVERTER, SURFACE LASER AND METHODS FOR THEIR OPERATION

[76] Inventor: Frank L. Varsanyi, 287 W. Ridge Drive, Portola Valley, Calif. 94025

[22] Filed: June 3, 1971

[21] Appl. No.: 149,532

[52] U.S. Cl. .......................... 337/94.5, 350/96 WG
[51] Int. Cl. ............................................. H01s 3/06
[58] Field of Search...................... 331/94.5; 330/4.3; 350/96 WG

[56] References Cited
UNITED STATES PATENTS
3,355,675  11/1967  Varsanyi ............................ 331/94.5
3,551,841  12/1970  Harrick ......................... 350/96 WG

OTHER PUBLICATIONS

Capelle et al., "Tuned Nitrogen Laser Pumped Dye Laser," Applied Optics, Vol. 9, No. 12, (December 1970), pp. 2742–2745.

Sousa et al., "A New Tuning Method for Dye Lasers," Rev. Sci. Instr., Vol. 42, No. 11, (November 1971), pp. 1736 and 1737.

Primary Examiner—William L. Sikes
Attorney—Flehr, Hohback, Test, Albritton & Herbert

[57] ABSTRACT

Laser action is developed in a minute crystal volume by direct excitation of an absorption line with a beam of a tuneable wavelength laser. Raising the energy intensity of the exciting beam causes an initial surface laser mode to shift into a penetration mode having an output aligned with the exciting beam. Energy converters are disclosed based upon the above.

7 Claims, 9 Drawing Figures

PATENTED JUL 17 1973 3,747,017
SHEET 1 OF 2
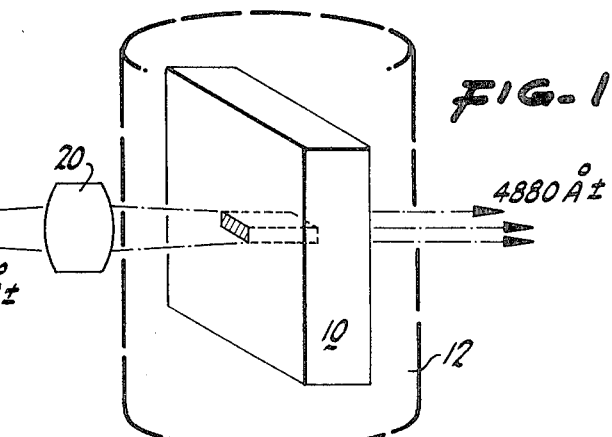
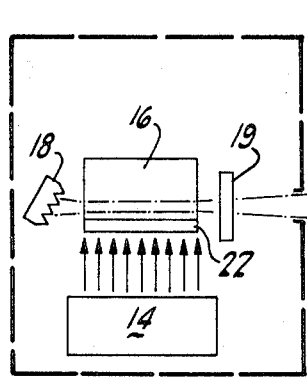
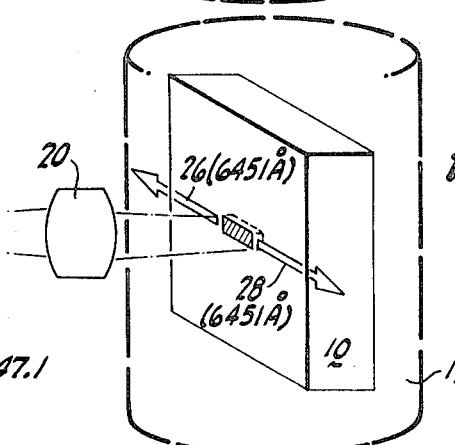
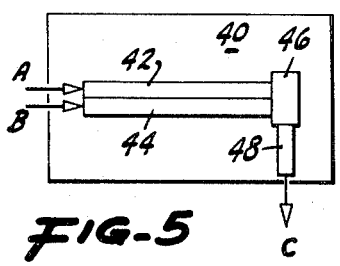
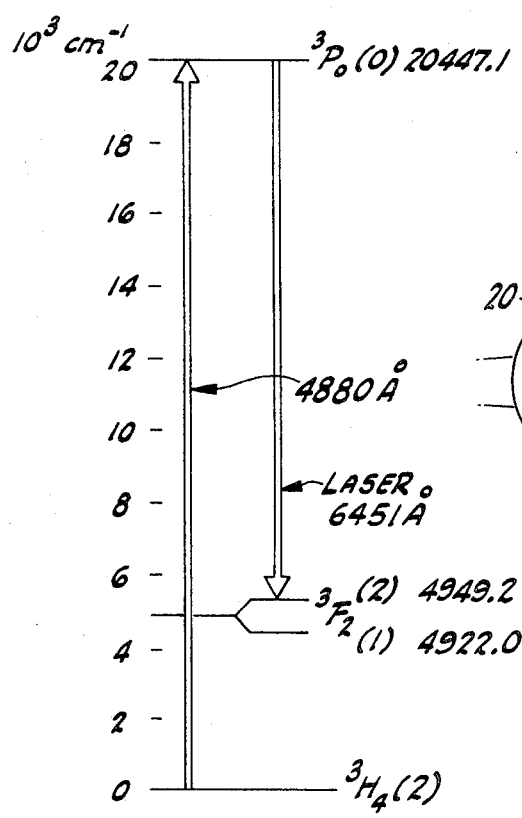
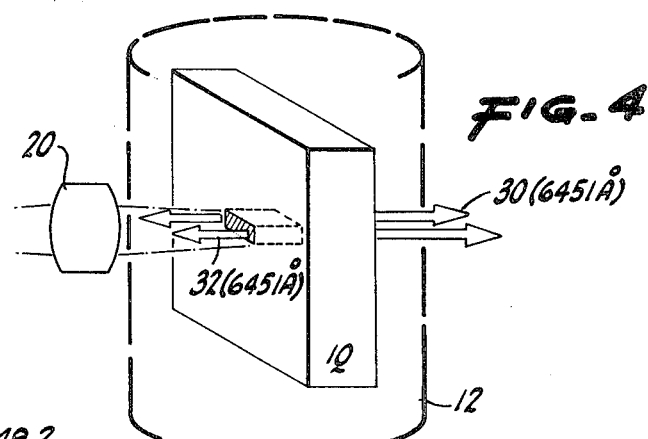
INVENTOR
FRANK L. VARSANYI
BY Flehr, Hohbach, Vest,
Albritton & Herbert
ATTORNEYS INVENTOR
FRANK L. VARSANYI
BY Flehr, Hohbach, Test,
Albritton & Herbert
ATTORNEYS

3,747,017

ENERGY CONVERTER, SURFACE LASER AND METHODS FOR THEIR OPERATION

BACKGROUND OF THE INVENTION

This invention relates to energy converters, surface lasers and to methods for their operation.

Heretofore, known energy converters and lasers have been difficult to reduce to compact sizes with an appropriate range of conversions, such as between electromagnetic energy bands, or to phonon fields. And, lasers typically have had single output beam direction controlled only by gross movement of the laser device or by some type of conventional optics. There are known certain optical devices which are deposited as film paths on substrates having potential application as components of optical computing systems. Generally, there does not exist a laser which can directly interface with such film type optical devices. Also, where the output of known lasers is confined by an energy reflecting cavity, it is bulky and only inconveniently shifted in orientation and is accordingly limited in its uses. There is, therefore, a need for a new and improved laser and method for changing the output direction of the beam therefrom.

SUMMARY OF THE INVENTION AND OBJECTS

In general, it is an object of the present invention to provide a surface laser and method which will overcome the above limitations and disadvantages.

A further object of the invention is to provide a surface laser having an active region lying adjacent to its surface and at least one output oriented in a plane parallel to said surface.

Another object of the invention is to provide a surface laser having a particular application as an active computing device in integrated optics.

A further object of the invention is to provide a superradiant laser having very low input power requirement and high efficiency whereby miniaturization of said laser is practical, said laser being so small that it can be directly interfaced or incorporated into thin film optical devices. The present invention is predicated upon the discovery that certain fluorescent solids, for example, $PrCl_3$ exhibit superradiant laser action when optically pumped with a laser beam tuned to a selected absorption line of the material. Such materials must possess an absorption for the exciting radiation and have high quantum efficiency. By selectively pumping such a fluorescent solid at the absorption line with monochromatic light, nearly complete absorption takes place within a very thin layer beneath the surface of the order of a few microns deep. In view of the high quantum efficiency, the gain of these materials is so high as to exhibit superradiant laser action with very small pump power levels, of the order of a micro-joule.

The direction of laser output is found to initially lie immediately beneath the surface and on the major axis of the area irradiated by the pump excitation. Thus, if the excitation light is projected on the crystal surface in the form of the image of a small elongated slit, threshold is first reached along the longest dimension and the laser action occurs along this axis. Rotating or moving this excitation beam image causes a corresponding movement in the surface laser beam which is thus easily steerable, making it ideal as the active element of integrated optics networks. Upon further increase of the excitation energy density, a second threshold is reached, whereby the incoming exciting light beam saturates layer after layer of the active ions until the depth dimension of the excited volume becomes larger in the direction perpendicular to the surface than along the surface. At this point the surface laser action abruptly ceases, and a strong "penetration" laser beam of the same wavelength as the surface beam exits the crystal both in the forward and in the backward direction.

If adjacent areas are irradiated they can be arranged so that the simultaneous excitation of both defines a new major axis for the combined areas which results in the step shift of the direction of surface laser output.

While 100 percent concentrated crystals of a certain rare earth, or transition element salts are the principal known materials exhibiting lasting action in accordance with the present invention, these materials and others satisfy certain general criteria which will be disclosed herein in connection with the following description in which the preferred embodiments and materials are set forth, together with examples of applications of the present laser including use as an active element in an integrated optics device.

A further general object is to provide new improved energy converter which will overcome the foregoing limitations and disadvantages.

Another object is to provide an energy converter which is particularly compact and which can be selected for generation or detection of electromagnetic energy in the visible, ultraviolet, infrared, or microwave bands, or to phonon fields.

The energy converter of the present invention is an extension of the foregoing laser in which either the exciting, input field, or the emission field is divided. As a detector, one portion of the input field is the output of a wavelength tuneable laser while the other portion is the excitation field to be detected, whether an electromagnetic field or a phonon field. These input fields must combine to exactly equal the wavelength (energy) of the absorption. As a generator, the output emissions are similarly divided into coherent electromagnetic fields or coherent electromagnetic and phonon fields.

BRIEF DESCRIPTION OF THE FIGURES

FIG. 1 schematically illustrates an arrangement of a laser device constructed in accordance with the present invention using a $PrCl_3$ crystal.

FIG. 2 is a simplified energy level diagram of $PrCl_3$.

FIG. 3 illustrates the manner in which the laser of FIG. 1 operates upon excitation intensity above a first threshold to give a surface laser output mode.

FIG. 4 illustrates the manner in which the laser of FIG. 1 operates upon excitation intensity above a second threshold to develop a penetration mode.

FIG. 5 is a schematic diagram showing application of the laser of FIG. 1 to a thin film optical computing device.

DETAILED DESCRIPTION OF THE PREFERRED EMBODIMENT

Figure 6:
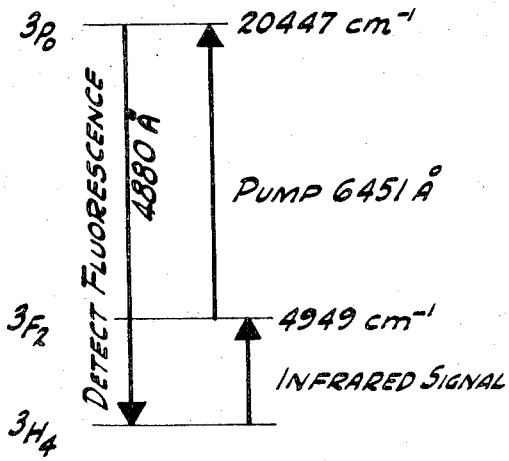
FIGS. 6 – 9 are energy level diagrams illustrating applications of the invention to energy conversion devices.

Referring now more particularly to FIG. 1, there is shown in schematic form the general arrangement of a laser constructed in accordance with the invention and includes a suitable crystal, one surface of which is pumped into a super radiant lasing condition. The particular wavelength of excitation and the means of achieving the same will vary depending upon the particular choice of crystal used. The present experimental arrangement will be set forth for nearly 100 percent pure crystal of PrCl$_3$ which, for example, was grown from the melt and cleaved to provide an optically flat face. To prevent contamination by dust and moisture the PrCl$_3$ crystal is encased in a protective case such as a quartz envelope 12. The crystal has about 5mm by 10mm cleaved surface on two opposing sides, and is about 3mm thick. It is as clear and transparent as high-quality optical glass with the characteristic pale green color of the praseodymium ionic absorption. The crystal is hexagonal and cleaves parallel to the C$_3$ axis quite perfectly, which contributes to the low threshold of the present device, as stimulated radiation does not encounter bumps, ridges, or other imperfections within the active area.

The pump excitation as in the embodiment illustrated in FIG. 1 is provided from repetitively pulsed nitrogen gas laser 14 having a useful output in the ultraviolet (3371A) which pumps a tuneable dye laser 16 tuned to a resonance by a double cavity including grating 18 and partially reflecting output mirror 19. The output of the dye laser is focused through a lens 20 and onto the surface laser crystal 10. In the arrangement with the PrCl$_3$, lens 20 is of an ordinary photographic type having a focal length of about 5 cm.

The dye laser was 4-methyl-umbelliferone in a $5 \times 10^{-3}$ mole/liter ethanol solution with 20 percent of 1 molar HCl-water solution added. The nitrogen laser output is focused into the dye cell with a simple 6mm diameter quartz rod 22 acting as a cylindrical lens. Lens 20 is mounted on a micrometer screw allowing precise movement along the light beam. Thus by focusing or defocusing the excitation energy density is changed on the crystal face. Although a specfic dye laser arrangement is shown herein, it will be understood to those skilled in the art that many other wavelength tuneable laser arrangements can be substituted for that disclosed.

The relevant levels of Pr$^{3+}$ spectrum are reproduced on FIG. 2. The $^3P_0$ level is non-denegenerate at 20 447.1 cm$^{-1}$, and is reached directly with the 4,880A excitation from the $^3H_4$ (2) ground state. Laser action originates directly from $^3P_0$ and terminates on $^3F_2$ (2) at 4949.2 cm$^{-1}$ giving 15,497.9 cm$^{-1}$ (vacuum) or 6,451A (air for the laser output). Terminating so high above the ground state makes efficient room temperature operation possible. The terminal state has a spectroscopic splitting factor $S_1 = 2.74$ which will allow considerable frequency tuning by magnetic field.

In a typical experimental arrangement the spectral (wavelength) output of the dye cell is adjusted by the relative angular position of the grating 18 to bring the pump frequency to a value close to but slightly off resonance, say 4,880A±. When the pump frequency is far enough off resonance, no fluorescence is observed and the crystal transmits the pump beam as shown in FIG. 1. However, as the excitation frequency is approached, an intense fluorescence of the crystal is observed at 6,451A and other wavelengths, 6,451A being the strongest.

As the frequency of the pump excitation is changed, by moving grating 18 and the excitation beam is brought close or at the peak of the $^3P_0$ absorption line, it is found that substantially all of the exciting light becomes absorbed within an extremely shallow region beneath the surface of the crystal. At this point, a threshold is reached in which the absorbing portion of the crystal spontaneously becomes a laser (FIG. 3) with surface oriented output beams 26, 28. This is signified by a sudden disappearance of all other visible fluorescence lines, and by drastic, sudden increase of 6,541 radiation, and by line narrowing from ~1 A to ~0.01 A, and by a directional laser output beam. The direction of the greatest laser gain within the region of the crystal immediately beneath the surface being excited is directed along the major axis of the excitation area as defined for example by the beam shape of the pump laser as controlled by exit slit 24.

Referring now to FIG. 4, a second penetration state or mode of laser of the present invention is illustrated which results from further intensification of the excited pump radiations by confining it to a smaller region with adjustment of lens 20, or, by increasing the excitation photon flux. This causes saturation of the laser media to increasing depth; that is to say, absorption occurs in deeper layers beneath the excited region after surface regions have been saturated so that pump radiation travels to greater and greater depths within the crystal. Ultimately, the depth of absorption within the crystal exceeds the greatest transverse dimension of the exciting beam at the crystal surface, so that the gain in the direction of the impinging pump radiation exceeds the transverse gain. At this occurence the direction of laser output abruptly shifts from a direction along the crystal surface to a direction essentially perpendicular to the surface as to produce output beams 30, 32, this method of operation being designated as a penetration mode. Output beams 30, 32 have a direction substantially in line with maximum dimension of excitation pocket caused in the medium.

The switch from the surface mode to the penetration mode of operation is a threshold phenomena, completely analogous to the first threshold of reaching laser action as opposed to fluorescence.

It is found, moreover, that both the "surface" and the "penetration" mode of operation are superradiant. This is seen when the crystal is tilted off-perpendicular respective to the excitation beam. A strong laser output is still observed, but now the material acts as its own wavelength selector prism, with the excitation and generated laser beams clearly separated, and non-perpendicular to the crystal face.

Examination with a Fabry-Perot etalon shows that the output beams 26, 28 or 30, 32 consist of a single component with about 0.01 cm$^{-1}$ spectral width. The output frequency is very stable, with no noticeable shift within the 0.01 cm$^{-1}$ instrumental resolution in several hours.

It is interesting to note that the state $^3F_2$ of Pr$^{+3}$ has its lowest component at 4922.0 cm$^{-1}$, some 27 cm$^{-1}$ below the 4949 terminal laser level. Rapid, phonon assisted relaxation is known to occur in like situations. Thus copious quantities of mono-energetic 27 cm$^{-1}$ phonons are generated in this PrCl$_3$ surface laser. It is believed that there is some evidence of interaction between the laser beam and the phonon field, which is being further investigated. Under the present experimental conditions of fast, 5 nanosecond excitation pulses no evidence of self termination is observed. This fact and the known very high infrared quantum efficiency makes it likely that, in a cascade-like process, an infrared laser is also generated along with the visible beam. It is entirely possible that the infrared laser and phonon laser (paser) suggested above can form the basis for a family of infrared and phonon generators and detectors.

There are other, high transistion probability lines originating on the $^3P_0$ laser level, and, by incorporating the $PrCl_3$ crystal in frequency selective cavity arrangement, operation can be obtained in the yellow, green and blue if different color operation is desired. Coincidence between the 4,880A strong Argon laser line and the 4,880A $^3P_0$ level of $Pr^{3+}$ can be used to extend the operation of the $Pr^{3+}$ surface laser to continuous operation at room temperature.

Surface laser action has been obtained in a praseodymium tribromide ($PrBr_3$). The behavior is very similar to that described about $PrCl_3$.

The following properties characterize the ability of a fluorescent material to function as a surface laser in accordance with the present invention. These properties are also found in many materials besides $PrCl_3$, to be described.

1. A high value of absorption coefficient at the desired monochromatic excitation frequency. The absorption is governed by equations of the form $$I = I_o \exp(\alpha x)$$

where $\alpha$ is the "absorption coefficient" having the dimension of $cm^{-1}$ and $x$ is the absorption path length within the material in cm. The absorption coefficient $\alpha$ is proportional to the number of absorption centers per unit volume $N$ (concentration) and to the appropriate transition probability oscillator strength, $f$:

$$\alpha = (\text{constant})(N)(f)$$

For the purposes of the present invention it is required that the penetration depth of the excitation radiation, $X_{max}$ be small, in the order of a few micrometers. ($X_{max}$ is defined as the absorption path length required for essentially total say, 99 percent absorption of the excitation beam.) This then requires the product $\alpha x$ to be in the order of 1 to 10. Based on the above $\alpha = (\text{constant})(N)(f)$ relation this can come about either $N$, or $f$, or both $N$ and $f$ being large. A high value of $N$ means a high concentration of absorbing species or centers. The absorption coefficient is considered to be sufficiently high for the present scope at a value ranging from $10^3$ $cm^{-1}$ or greater up to $10^6$ $cm^{-1}$ although values from $10^2$ $cm^{-1}$ up can be considered potentially useful in the visible spectrum. Values of $\alpha$ smaller than $10^2$ $cm^{-1}$ can be considered as sufficiently high when operating in the infrared, or microwave region of the spectrum. As an order of magnitude estimate, the depth of penetration $x_{max}$ of the exciting radiation for the 100% $PrCl_3$ laser in FIG. 3 is about 1 micron.

As noted above, the second alternate to achieve a sufficiently large absorption coefficient $\alpha$ is to have a large transition probability between the ground and the desired excited state.

This can come about by a variety of mechanisms such as strongly allowed band to band transitions in semiconductor materials, and the like.

2. The second criteria satisfied for $PrCl_3$ and required of any material serving as a surface laser in the sense of the present invention is that the active center (ion, in $PrCl_3$) has a high radiative quantum efficiency, producing essentially lossless fluorescent line emission, in comparison with competing phonon interactions. This means that the probability of an excited electron decaying by fluorescence from the excited state is much higher than the probability of its relaxing to the intermediate or ground states by phonon relaxation processes.

While a very large variety of 100 percent rare earth, transition, and actinide ion salts as well as II—IV and III—V semi-conductor materials can have the desired high absorption coefficient, the second condition concerning the efficiency of fluorescence and thus of surface laser action is satisfied by a much more restricted class of materials. In general, the soft crystals, including rare earth chlorides, bromides, and iodines possess high fluorescent efficiencies and have a low phonon - active ion interaction which might materially aid such fluorescence. As a general rule it can be said that a maximum lattice phonon energy of about one-tenth or less of the laser radiation energy is very satisfactory, while a phonon energy approaching a third or half of the laser photon energy is rather unfavorable competition. Values in between are reflected in the increasing laser threshold pumping requirements as well known in prior, solid-state lasers.

In addition to the rare earth halides enumerated above, mixtures of pure rare earth chlorides may be quite satisfactory.

In addition to the rare earths, which utilize 4f electron transitions, the 5f transistions exhibited by actinide elements as well as 3d transitions of the transition elements indicate that actinide and transition chlorides, bromides and iodides can also be utilized as lasers in accordance with the present invention.

In accordance with the foregoing, crystals made of a combination of an anion and a cation selected from the following lists, are fluorescent and are believed to be suitable materials for use in the present invention.

FLUORESCENT MATERIALS

A. Anions

1. Rare Earths (4f)
   - $Pr^{3+}$
   - $Nd^{3+}$
   - $Sm^{3+}$
   - $Sm^{2+}$
   - $Ce^{3+}$
   - $Eu^{3+}$
   - $Eu^{2+}$
   - $Gd^{3+}$
   - $Tb^{3+}$
   - $Dy^{3+}$
   - $Tm^{3+}$
   - $Er^{3+}$
   - $Yb^{3+}$
   - Ho 2. Actinide (5f)
   - $U^{3+}$
   - $Np^{3+}$
   - Uranyl 3. Transition (3d)
   - Mn
   - Fe
   - Co
   - Cu
   - Cr
   - V
   - Ti
   - Ni
   - Zn

C. Cation

- chloride
- ethylsulfates
- brimide
- iodide
- ortho aluminate
- tunstate
- double tungstate
- vanadate
- molybdate
- glasses (high concentration)
- garnets
- oxides
- oxichlorides
- fluoride
- hydroxides In addition, the following materials are believed to satisfy the conditions for a surface laser in accordance with the present invention:

Manganese fluoride
Chromium oxide
Gallium arsenide (Excitions)
Sesqui-sulfides
Zinc Selenide
Gd Sulfide
Zinc Sulfide
exciton materials The foregoing general conditions can also be satisifed by certain complex molecular compounds, as for example, those rare earth ortho aluminates such as terbium ortho-aluminate in which the rare earth ion interacts only with its instant neighbors with very low energy phonon the order of 100—200 wave numbers. However, the lattice as a whole of such a material interacts at 1,000 - 2,000 wave numbers from which leads to mechanically rugged and physically stable properties. Selected rare earth, transition, and actinide peroxides, oxi-chlorides, are also expected to be useful active substances for carrying out the present invention.

The following is a representative sample of lasers selected from the foregoing which will serve to illustrate selection of materials for use in the present invention.

Rare earth halides a. $PrCl_3$
  absorption — $^3H_4$(ground) to $^3P_0$ (20,447 cm$^{-1}$) laser to $^3F_2$ (4,949 cm$^{-1}$) at 6,451A b. $PrBr_3$
  absorption — $^3H_4$ to $^3P_0$ (20,372 cm$^{-1}$) laser to $^3F_2$ (4,913 cm$^{-1}$)

c. $NdCl_3$
  absorption $^4I_{9/2}$ to $^2G_{7/2}$ (18,993 cm$^{-1}$) laser to $^4I_{11/2}$ (1,974 cm$^{-1}$) at 5,873A d. $ErCl_3$
  absorption $^4I_{13/2}$ to $^2H_{9/2}$ (24,395 cm$^{-1}$) laser to $^4I_{13/2}$ (6,481 cm$^{-1}$) at 5,580A

Rare earth salt e. $IbAlO_3$
  absorption ground state to $^5D_4$ (20,462 cm$^{-1}$) laser to $^7F_5$ (2,112 cm$^{-1}$) at 5,448A f. $UCl_3$
  absorption $^4I_{9/2}$ (ground) to $^4I_{15/2}$ (11,500 cm$^{-1}$) laser to $^4I_{11/2}$ (4,436 cm$^{-1}$) 1.4 A

II – VI compound g. CdS
  absorption ground state to $A_1$ at 4875A laser at 5,160A

Others h. $ZnS:Mn^{2+}$
  absorption ground to 20,100 cm$^{-1}$ at 4,950A laser at 5,589A i. $Tb^{3+}$ in $SiO_2$
  absorption ground to $^3O_3$ (26,500 cm$^{-1}$) laser to 5,036 cm$^{-1}$ at 4,740A Referring again to the example given $PrCl_3$ and $PrBr_3$, it will be noted that the $3F_2$ state is so far above the ground state that it is essentially unpopulated at room temperature. Accordingly, such lasers of the present invention are capable of operation as a subminiature device at room temperature. The active area of these surface lasers is in the order of a few square microns. This has made some visually spectacular effects possible whereby the excitation light was focused on a tiny $PrCl_3$ or $PrBr_3$ crystallite which was hardly visible to the naked eye, and upon reaching the threshold energy density the little "dust" particle lighted up with the brilliant red glow of the laser output. It suggests that such a "powder laser" dispersed in an appropriate carrier such as liquid gas or solid of similar index of refraciton opens up new possiblities in display technology.

Both $PrCl_3$ and $PrBr_3$ can easily be vacuum deposited, at about 2mm vapor pressure at 1,000°C so that the well-developed masking techniques of the integrated electrical circuit technology can be used to form integrated optics networks containing lasers of the present invention.

$PrCl_3$ possesses a further advantage that its absorption line from $^3H_4$ to $^3P_0$ lies near 4,880A and coincides with a major output line of the well known Argon laser. In addition, the amount of energy required to achieve a laser action can be incredibly small in the order of a micro-joule for $PrCl_3$.

The foregoing advantages and features of the laser of the present invention lend it to an active device in optical computer applications.

Referring now particularly to FIG. 5, a simplified form of optical computer active element disposed on a substrate 40 is illustrated and consists of thin film optical channels A (42) and B (44) which are directed into a thin film of active surface layer 46 such as $PrCl_3$. An output channel C (48) is disposed on the substrate 40 to receive any surface beam generated and directed transversely of input channels 42, 44. Let signal A or B be present and arranged to have a strength sub-threshold to the surface lasing mode. Then the output of the device is the fluorescence signal or zero (A or B at 4,880A, fluorescent condition). If, however, both channels A and B are present, the intensity level and the effective gain length for each portion of the active element is combined and is set to exceed threshold for surface lasing mode (at 6,451A) at which point the lasing occurs to provide an output transversely of the A, B channels and feed into channel C. Obviously, a device of this type can be an AND gate with the truth table $$\bar{A}\,\bar{B} = O$$

$$A\,\bar{B} = \bar{A}\,B = O \text{ (fluorescence)}$$

$$A\,B = 1 \text{ (laser)}$$

FIG. 6 shows the present invention used as an infrared quantum counter using $PrCl_3$. The input infrared signal lifts the ions to $^3F_2$ from the ground state. By maintaining a constant pump field at 6,451A to which the ground state is otherwise transparent each infrared quanta will lift one center $^3P_0$ from which fluorescence at 4,880A can be easily detected.

Figure 7:
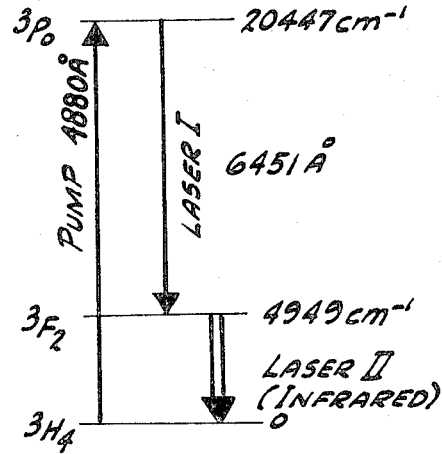

FIG. 7 shows the present invention $PrCl_3$ used as an infrared generator. As previously suggested, the $PrCl_3$ laser of the present invention is believed to generate an infrared laser output II in decay from the $^3F_2$ level to $^3H_4$, in addition to the red laser I at 6,451A.

Figure 8:
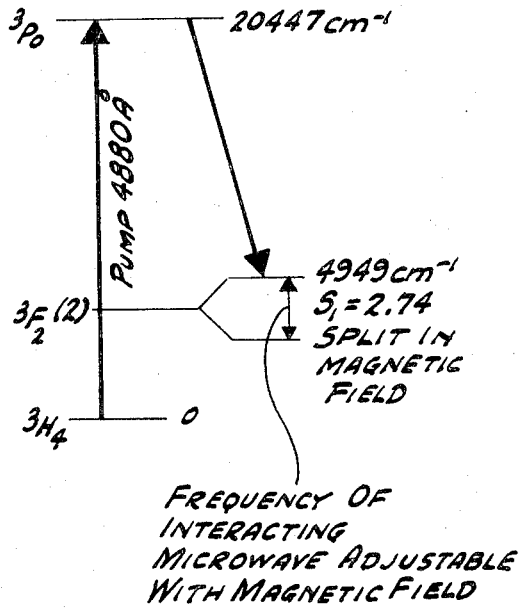

FIG. 8 illustrates the generation of microwaves using laser, $PrCl_3$, of the present invention. Thus coherent microwaves are generated in the $^3F_2$ split, caused by a controlling magnetic field. By varying the magnetic field strength the frequency of the microwave so generated can be varied.

Figure 9:
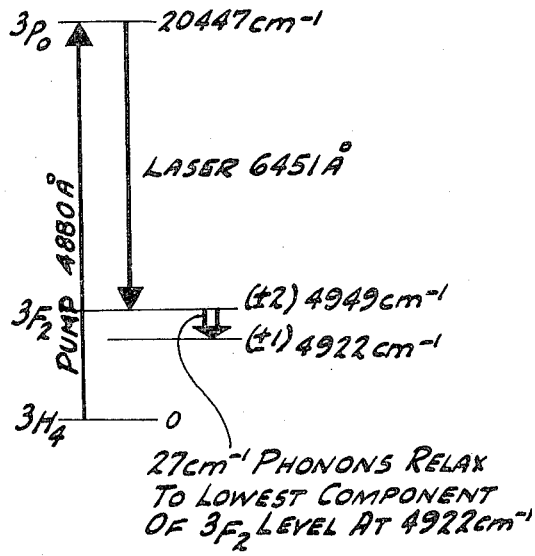

FIG. 9 illustrates a coherent phonon generator using the PrCl$_3$ crystal laser of the present invention. Relaxation of the lowest $^3F_2$ level at 4,922 cm$^{-1}$ from 4,949 cm$^{-1}$ produces 27 cm$^{-1}$ phonons.

I claim:

1. In a surface laser, a medium having a high absorption transition from a ground state to an excited state, and possessing a third state to which radiative decay takes place to define a fluorescent radiative transition in response to being excited with radiation of a particular wavelength corresponding to said absorption, said medium having low losses between said excited and third states except for said radiative transition, pump means forming a monochromatic output beam to couple to said absorption transition, said output beam being directed into the surface of said medium for optically pumping said medium from the ground state into said excited state, the high absorption transition probability resulting in complete absorption of said pump beam within a small volume of said medium, said medium having a first, surface mode of laser oscillation lying parallel to the input surface thereof and in alignment with a major transverse axis of the region excited by said pump beam, and a second, penetration mode in alignment with the major dimension of the volume excited by said pump beam, said penetration mode being threshold activated when the intensity of the pump beam produces a depth of penetration within said media greater than the transverse extent of said beam at said input surface.

2. A laser as in claim 1 in which said pump means comprises a wavelength tunable laser.

3. A laser as in claim 2 in which said wavelength tunable laser is a nitrogen pumped, dye laser.

4. A laser as in claim 1 in which said media is selected from a substantially pure, inorganic salt of the rare earth, transition and actinide elements having unfilled 4$f$, 3$d$ or 5$f$ electron shells.

5. A laser as in claim 4 in which said media is a crystalline powder.

6. A method for changing the output mode and direction of a laser of the type employing a medium having a high concentration of active centers possessing a well defined upper state and at least one lower state defining a fluorescent radiative transition when excited with pump radiation of a particular wavelength, said medium having a high coefficient of efficiency, the steps of pumping said medium with a laser beam having an output frequency capable of being absorbed to excite active centers in said medium into said upper state, the high concentration of active centers resulting in nearly complete absorption of the pump laser beam within a small depth within said medium, maintaining the intensity of radiation of said pump laser beam on said medium at a level sufficient to excite the surface laser with an action having an output beam line parallel to the input surface of said media at the region of excitation to thereby obtain a first mode of laser output from said media, increasing the intensity of exciting radiations above said threshold whereby the depth of penetration of the pump medium in said media exceeds the greatest lateral extent of said beam whereupon said laser media step shifts into a second mode having an output beam in alignment with the excited region, depth and direction.

7. An energy converter for changing an input electromagnetic or phonon field of a predetermined wavelength into a electromagnetic or phonon field of a different wavelength comprising, a body of solid matter having a plurality of active centers characterized by an absorption transition of a predetermined radiation wavelength in response to excitation at said wavelength from a lower state to an upper state of said active centers from which radiative decay takes place over an emission transition having a different energy content from said absorption transition, said matter having a high absorption coefficient at said absorption transition and low losses over said emission transition, means for irradiating said body with one or more irradiation fields the combined energy sum of which is equal to said absorption transition whereby said active centers are energized with consequent emission at said different wavelength, at least one of said irradiation fields being a wavelength tunable laser beam, said irradiation fields being absorbed in a small volume of high energy density in said body.

* * * * *